United States Patent [19]
Heard et al.

[11] 4,362,413
[45] Dec. 7, 1982

[54] RETRIEVABLE CONNECTOR ASSEMBLY

[75] Inventors: Richard A. Heard, Dallas; Aaron E. Pierce, Humble, both of Tex.

[73] Assignee: Exxon Production Research Co., Houston, Tex.

[21] Appl. No.: 102,064

[22] Filed: Dec. 10, 1979

[51] Int. Cl.³ .............................................. F16B 7/18
[52] U.S. Cl. ..................................... 403/14; 403/337
[58] Field of Search ................ 403/348, 349, 337, 20, 403/21, 13, 14; 411/166, 116, 119

[56] References Cited
U.S. PATENT DOCUMENTS

| 3,248,129 | 4/1966 | Brown | 285/18 |
| 3,598,392 | 8/1971 | Williamson et al. | 403/348 X |
| 3,635,435 | 1/1972 | Perison, Sr. | 403/349 X |
| 3,908,330 | 9/1975 | Frach et al. | 403/348 X |
| 4,126,183 | 11/1978 | Walker | 166/338 |
| 4,181,196 | 1/1980 | Darby et al. | 166/361 |

FOREIGN PATENT DOCUMENTS 822016 10/1959 United Kingdom .

Primary Examiner—Andrew V. Kundrat
Attorney, Agent, or Firm—Marc L. Delflache

[57] ABSTRACT

A retrievable connector assembly is disclosed for securing two parts together. The assembly includes a guide frame to support the first of two parts and a pair of rotatable shafts with threaded ends to carry male coupling members with pins which extend from each coupling member. The assembly also includes a mounting hub attached to the second part. The mounting hub includes female coupling members having slots to receive the pins of the male coupling members. Rotation of the shafts moves the pins into lateral legs of the slots locking the two parts together. Further rotation of the shafts causes the male coupling members to move upward along the shafts forcing the first and second parts together. The two parts can be separated for retrieval by rotating the shafts in the reverse direction thereby separating the male and female coupling members.

9 Claims, 7 Drawing Figures

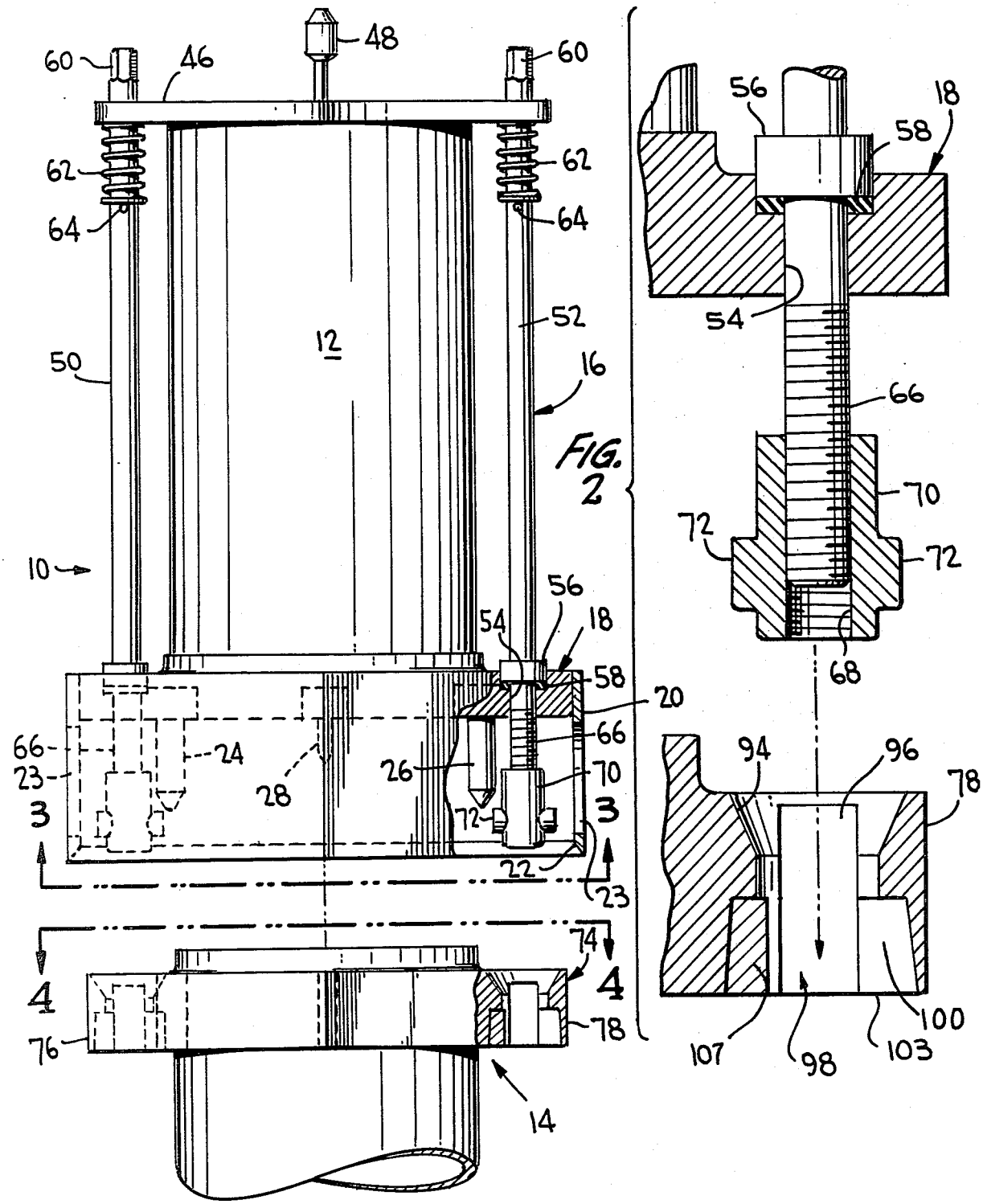

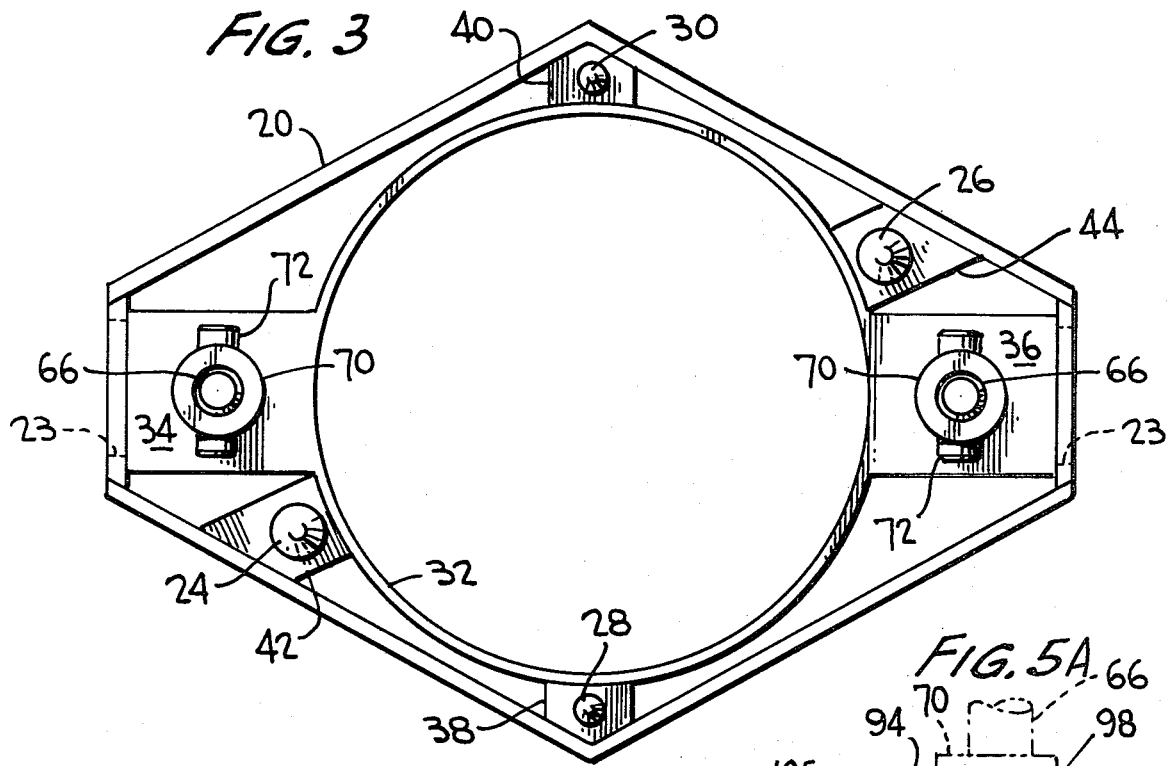
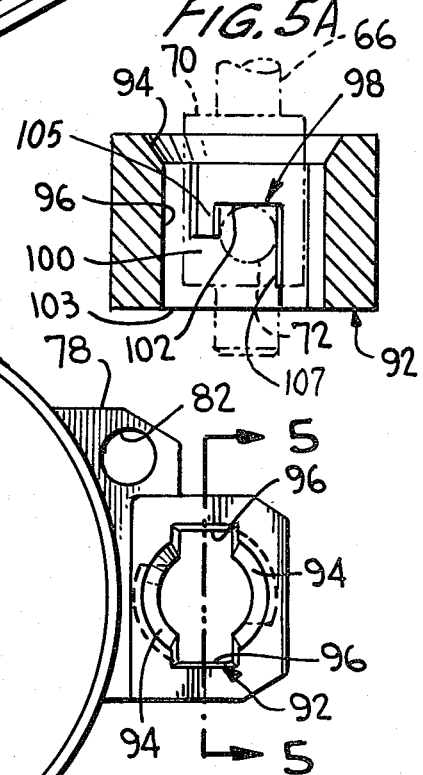
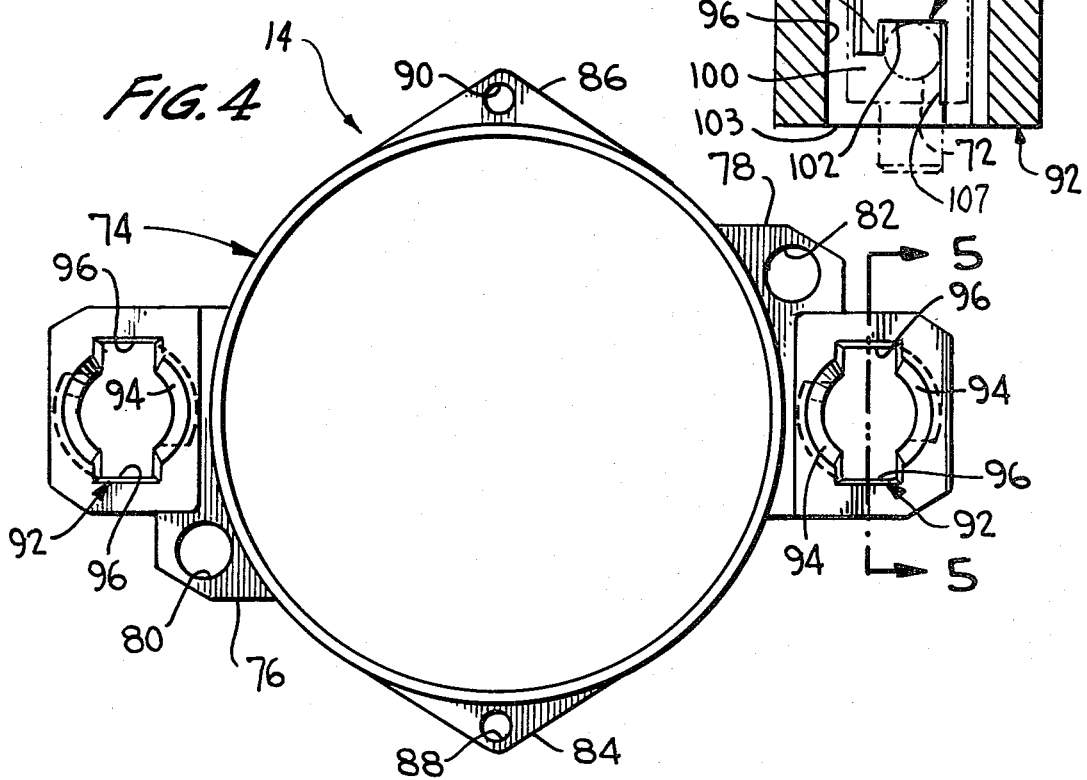

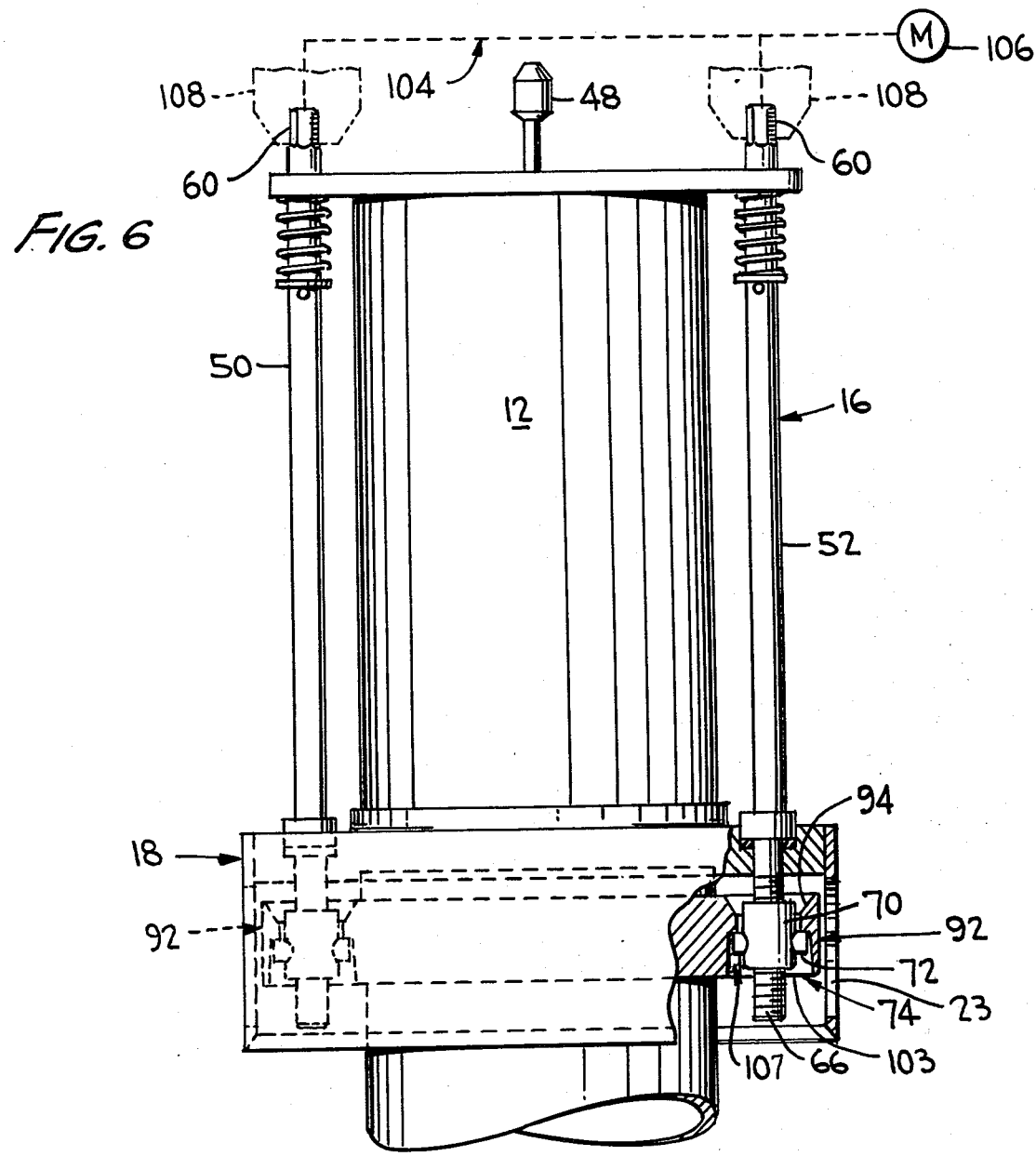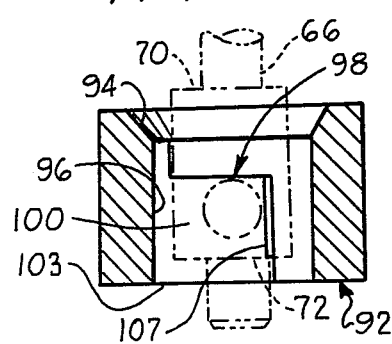

4,362,413

RETRIEVABLE CONNECTOR ASSEMBLY

BACKGROUND OF THE INVENTION

1. Field of the Invention

The present invention relates to connector assemblies for securing parts together. More particularly, the present invention relates to a retrievable threaded bolt connector assembly to couple two submerged components of a subsea structure.

2. Description of the Prior Art

As the development of offshore oil and gas fields expands to deep water, the use of conventional fixed structures which extend above the water surface become infeasible. A more practical alternative is the use of submerged or subsea production systems. However, due to the deeper water depths (i.e. 600 to 6000 ft.), it is necessary that the production system be remotely operated. One type of remote operation which would be frequently required is the coupling of underwater components or control modules. These modules which may house various types of control equipment, such as hydraulic and/or electrical actuating systems, would be coupled by means of a connector in a vertical mode. That is, the connector assembly would be responsive to a remotely controlled maintenance tool lowered from the water surface.

Conventional underwater connector assemblies, such as male members having lateral pins which are received in slots of female members, are retrievable but fail to provide the required make-up force to establish the hydraulic and electrical connections necessary between modules. The successful operation of the equipment housed on the underwater modules is dependent on the adequacy of the hydraulic and electrical connections. Threaded bolt connectors, such as direct tap connectors and bolt/nut fasteners, are capable of producing the required make-up force for hydraulic and electrical connections. However, they cannot be reliably retrieved because the threads are frequently stripped or otherwise jammed after the underwater connection is made. This would prevent the retrieval of the module by remote operations.

SUMMARY OF THE INVENTION

The present invention overcomes the above-described disadvantages by providing a retrievable threaded bolt connector assembly which is remotely operable. The invention is capable of coupling two submerged parts together with a make-up force sufficient to establish adequate underwater hydraulic and electrical connections between the parts.

The present invention includes a frame attached to the first submerged part or module. Rotatable shafts are located along the periphery of the frame and include a threaded end. A male coupling member having internal threads is screwed into the end of the shaft. The coupling member includes pins which extend radially outward. This coupling member is moveable along the shaft in response to relative rotation between the shaft and coupling member. The present invention also includes a mounting hub attached to the second submerged part or module. The mounting hub includes a female coupling member having a pair of slots to receive the pins of the male coupling member. The first and second parts are remotely attached by rotation of the pins into the slots of the female coupling member.

The invention is retrievable by the opposite rotation of the shaft required for the connection thereby unscrewing the shaft from the male coupling members. Thus, the male coupling member is re-aligned within the female coupling member permitting its retrival in a vertical mode, or it is completely unscrewed from the shaft and falls free of the female coupling member toward the sea floor. Furthermore, the invention can be retrieved even when the threads of the shaft are stripped or otherwise jammed by cutting the shaft which permits the male coupling member and part of the severed shaft to fall free of the female coupling member.

The present invention permits high make-up forces with threaded bolt connectors without the normally concomitant disadvantage of being irretrievable.

BRIEF DESCRIPTION OF THE DRAWINGS

FIG. 1 is a side elevation, partly in section, of a structure embodying the present invention.

FIG. 2 is a broken, exploded view in section of the coupling members of a structure embodying the present invention.

FIG. 3 is a bottom plan view of the male coupling member of a structure embodying the present invention taken along line 3—3 of FIG. 1.

FIG. 4 is a top plan view of the female coupling member of a structure embodying the present invention taken along line 4—4 of FIG. 1.

FIG. 5A is a section taken along line 5—5 of FIG. 4 showing a J-slot configuration of the female coupling member.

FIG. 5B is a section taken along line 5—5 of FIG. 4 showing an alternate embodiment of the slot configuration of the female coupling member, an L-slot configuration.

FIG. 6 is a side elevation, partly in section, of a structure embodying the present invention after coupling.

DESCRIPTION OF THE PREFERRED EMBODIMENTS

A retrievable threaded bolt connector assembly 10 according to the present invention is shown in FIG. 1. The connector assembly is used to secure a control module 12 to a mounting hub 14. While the retrievable threaded bolt connector assembly 10 can be used for the remote connection of parts in any application where make-up and fastening requirements dictate the use of threaded bolt connectors along with retrievability and reliable remote operation, the connector assembly 10 is particularly designed for submerged or offshore production system applications wherein the control module 12 is vertically lowered to make-up with the mounting hub 14. The connector assembly is designed to withstand large connecting forces, i.e., approximately 160,000 pounds, to establish adequate underwater hydraulic and electrical connections.

The control module 12 is carried on a guide frame 16 thereby forming a male coupling portion. The male coupling portion includes a base 18 with a peripheral skirt 20 terminating at a bevelled lip 22. The skirt 20 has openings 23 at opposite ends to provide access to the interior of the male coupling portion. The skirt 20 may include additional openings around its periphery for underwater viewing of the connection between the control module 12 and the mounting hub 14.

Referring to FIG. 3, coarse alignment pins 24 and 26 depend from the base 18. They are disposed at diametrically opposed positions adjacent the elongated ends of the base. Fine alignment pins 28 and 30 are also disposed at diametrically opposed positions along the sides of the base.

To hold the control module 12 in place, the base 18 includes a ring 32 and legs 34 and 36 which extend radially outwardly from the elongated ends of the base. The skirt 20 is attached to the legs 34 and 36. The base 18 also includes arms 38, 40, 42 and 44 which extend between the ring 32 and the skirt 20. The fine alignment pins 28 and 30 depend downwardly from the arms 38 and 40, respectively, while the coarse alignment pins 24 and 26 depend downwardly from the arms 42 and 44, respectively.

At the top of the guide frame 16 is a plate 46 (see FIG. 1). A latch post 48 extends upwardly from the center of the plate 46 for coupling the retrievable threaded bolts connector assembly 10 with a remotely controlled maintenance tool. The maintenance tool is used for positioning the guide frame beneath the water surface.

A pair of shafts 50 and 52 extend through the plate 46 and base 18. Referring to FIG. 2, each shaft passes through a bore 54 in the leg of the base and carries a collar 56 which is seated on a thrust bearing 58. The bearing 58 is located in a counterbore of the bore 54.

The upper drive ends 60 of the shafts 50 and 52 have hexagonal configurations. The shafts are biased toward base 18 by helical springs 62 coiled around the shafts and mounted in compression between the top plate 46 and a pin 64 carried by each shaft.

The male coupling portion includes a male coupling member 70 in the form of a collar having diametrically opposed pins 72. The lower end 66 of each shaft is externally threaded to engage internal threads 68 of the male coupling member 70.

Referring to FIG. 4, the mounting hub 14 includes a flange 74 with ears 76 and 78. The ears 76 and 78 have holes 80 and 82 for receiving the coarse alignment pins 24 and 26, respectively. The flange also includes portions 84 and 86 having holes 88 and 90 therein for receiving the fine alignment pins 28 and 30, respectively. Mounted on each of the ears 76 and 78 is a female coupling member in the form of a socket 92 having opposing, arcuate bevelled top edges 94 extending from slideways 96 such that the mouth of each socket has a keyhole configuration. Each slideway 96 is parallel to the axis of the mounting hub 14 forming a slot 98. The term "slot" as used herein includes any slot configuration having a portion defining a longitudinal leg for insertion of a pin and a portion defining a lateral leg to restrain the pin against further longitudinal movement.

Referring to FIG. 5A, the slot configuration 98 illustrated is J-shaped. Once the pins advance to the end of the longitudinal leg 96, they are rotated into the lateral leg 100. The lateral leg includes a lip 105 forming an upper recess 102 which restrains further movement of the pin 72. Alternatively, the slot configuration may be L-shaped as illustrated in FIG. 5B. This configuration includes a longitudinal leg 96 with a lateral leg 100. This principal difference between the L-slot compared to the J-slot is the absence of the lip 105 which forms the recess 102. Rather, the pin is restrained from further lateral movement merely by striking the edge 107 of the lateral leg 100.

Each socket 92 includes a pair of either J-shaped or L-shaped slots with oppositely disposed longitudinal and lateral legs. The bottom of each socket 92 is open as indicated to 103 to permit passage of the threaded ends 66 of the shaft and the male coupling member 70.

The operation of the present invention is best illustrated by referring to FIG. 6. The guide frame 16 is attached via the latch post 48 to a remotely controlled maintenance tool, generally indicated at 104. The tool 104 includes a hydraulic motor 106 and driving chucks 108 to engage the hexagonal drive ends 60 of the shafts 50 and 52; such permits rotationally movement of the shafts in either a clockwise and counterclockwise direction. The maintenance tool 104, attached to the guide frame 16, is lowered until the pins 72 of the male coupling members 70 engage the mouths of the sockets 92. If the pins 72 are not aligned with the longitudinal legs or slideways 96, the shafts are turned via motor 106 until they are aligned thereby permitting further longitudinal insertion of the male coupling members in the female coupling members. Once the pins 72 are fully positioned longitudinally in the slideways 96, the shafts 50 and 52 are rotated, via motor 106, clockwise. This provides lateral movement of the pins 72 until they abut the edge 107 of the lateral leg, as best shown in phantom in FIGS. 5A and 5B. In the case of a J-slot, the pins 72 would come to rest in the recess 102. In the case of an L-slot, the pins would come to rest against the edge 107 of the lateral leg 100. Obviously, the pins in FIG. 5A may abut directly against the edge of the lateral leg 100 and also be in the recess 102.

Thereafter, continued clockwise rotation of the shafts causes the male coupling members 70 to move longitudinally upward along the shafts due to the threaded connection between the shaft ends 66 and the male coupling members 70. Accordingly, the control module 12 can be coupled to the mounting hub 14 with a high make-up force, i.e., approximately 160,000 pounds, by controlling the torque applied to the shafts via motor 106 once the pins 72 are firmly engaged in the slots.

When it is desirable to detach the control module 12 from the mounting hub 14, the shafts 50 and 52 are rotated in a counterclockwise direction. When the pins 72 are firmly engaged within the recess 102, counterclockwise rotation causes relative separation between the shafts and the male coupling members 70. In this manner, the male coupling members unscrew from the shafts and fall free of the female coupling members, to the sea floor. Alternatively, the male coupling member may rotate slightly with the counterclockwise rotation of the shaft once the pins 72 clear the lips 105. Thereafter, the male member 70 will rotate until the pins are in alignment with the longitudinal legs 96. Once this happens or the member 70 unscrews and falls to the sea floor, the frame can be drawn upwardly away from the mounting hub and retrieved. In the case of an L-shaped slot, the pins 72 are re-aligned within the slideway 96 when the shaft is first rotated since there is no lip 105 to restrain their counterclockwise rotation. Thus, the frame can be drawn upwardly once pins 72 are re-aligned within the longitudinal legs.

If the threaded connection between any male coupling member and its shaft becomes stripped or otherwise jammed, a cutting tool can be inserted through the opening 23 in skirt 20 to cut the shaft in two above the male coupling member. Thus, the male coupling member is free to fall through the opening 103 in the bottom of the female coupling member. The frame can then be returned by connecting a remotely controlled maintenance tool to the latch post 48 and lifting. In any event, the present invention is designed such that once the male coupling portion is retrieved, the non-retrievable mounting hub remains intact below the water surface for subsequent subsea connections.

Initial alignment for the control module 12 and the mounting hub 14 is provided for by the skirt 20 contacting the flange 74. Once the skirt engages the flange further lowering of the module permits coarse alignment by means of the pins 24 and 26 and the fine alignment by means of pins 28 and 30. However, the use of the coarse and fine alignment pins is primarily to ensure an accurate alignment for the electrical and hydraulic connections of the control module as mentioned above. The male and female coupling members do not need the course and fine alignment pins to engage. Indeed, this is part of the advantage of the present invention. The slots 98 can be made to low tolerances since they are substantially unaffected by the subsea environment.

Therefore, it is apparent from the above that the retrievable threaded bolt connector assembly 10 of the present invention permits the retrieval and replacement of all threaded components with each control module change.

Inasmuch as the present invention is subject to many variations, modifications and changes in detail, it is intended that all subject matter discussed above or shown in the accompanying drawings be interpreted as illustrated and not in a limiting sense.

What is claimed is:

1. A retrievable connector assembly for detachably securing a control module to a submerged mounting hub comprising:
    frame means supporting the control module including a base, a top plate and a plurality of rotatable shafts extending between said top plate and said base having drive ends disposed adjacent said top plate and threaded ends disposed below said base;
    a plurality of male coupling means each threadedly engaging one of said threaded ends of said shafts and carrying pins extending therefrom, said male coupling means being movable along said shafts in response to relative rotation therebetween;
    a flange carried by the mounting hub including a plurality of female coupling means each arranged to receive one of said male coupling means and having slots for receiving said pins as said pins are moved longitudinally and laterally therein; and
    means for engaging said drive ends of said shafts for rotating said shafts and moving said pins laterally to engage in said slots such that continued rotation of said shafts moves said male coupling means longitudinally along said threaded ends to detachably tighten the control module against the mounting hub.

2. A retrievable connector assembly as recited in claim 1 wherein said slots of each of said female coupling means includes a longitudinal leg for receiving said pins during longitudinal movement of said male coupling means and a lateral leg for receiving said pins when said shafts are rotated.

3. A retrievable connector assembly as recited in claim 2 wherein said slots each includes a recess joining said lateral leg for securing said pins in said female coupling means.

4. A retrievable connector assembly as recited in claim 1 wherein said frame means includes a skirt attached to said base and extending therefrom to contact said flange.

5. A retrievable connector assembly as recited in claim 1 wherein said frame means includes coarse and fine alignment pin means extending therefrom and said flange includes coarse and fine alignment hole means for receiving said coarse and fine alignment pin means, respectively.

6. A retrievable connector assembly as recited in claim 1 wherein said female coupling means has an opening in the bottom thereof to permit passage of said male coupling means therethrough.

7. A retrievable connector assembly for detachably securing first and second parts together comprising:
    frame means attached to the first part and including a rotatable shaft having a threaded end and male coupling means threadedly engaging said threaded end and having pins extending therefrom, said male coupling means being movable along said shaft in response to relative rotation therebetween; and
    mounting means attached to the second part and including female coupling means for receiving said male coupling means and having slots therein formed of a longitudinal leg joined with a lateral leg, said pins being longitudinally movable along said longitudinal leg and rotatably movable along said lateral leg in response to rotation of said shaft to lodge said pins in said lateral leg and cause said male coupling means to move longitudinally along said shaft to force the first and second parts together, wherein said female coupling means includes a socket having a mouth with bevelled edges adjacent to said longitudinal leg for guiding said pins into said longitudinal leg and an opening in the bottom of said socket opposite said mouth to permit passage of said threaded shaft and said male coupling means therethrough.

8. A retrievable connector assembly for detachably securing first and second parts together comprising:
    frame means attached to the first part and including a rotatable shaft having a threaded end and male coupling means threadedly engaging said threaded end and having pins extending therefrom, said male coupling means being movable along said shaft in response to relative rotation therebetween;
    mounting means attached to the second part and including female coupling means for receiving said male coupling means and having slots therein formed of a longitudinal leg joined with a lateral leg, said pins being longitudinally movable along said longitudinal leg and rotatably movable along said lateral leg in response to rotation of said shaft to lodge said pins in said lateral leg and cause said male coupling means to move longitudinally along said shaft to force the first and second parts together; and
    said frame means includes coarse and fine alignment pin means extending therefrom and said mounting means includes coarse and fine alignment hole means for receiving said coarse and fine alignment pin means, respectively.

9. A retrievable connector assembly as recited in claims 1, 7 or 8, wherein said frame means includes a means for accessing said shaft to cut said shaft under emergency conditions, thereby severing said male coupling means from said shaft permitting the retrieval of said frame means.

* * * * *